United States Patent
Xu et al.

(10) Patent No.: US 10,091,641 B2
(45) Date of Patent: Oct. 2, 2018

(54) METHOD AND APPARATUS FOR SUPPORTING LOCAL GATEWAY SERVICE FOR DUAL CONNECTIVITY IN WIRELESS COMMUNICATION SYSTEM

(71) Applicant: LG ELECTRONICS INC., Seoul (KR)

(72) Inventors: Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/326,028

(22) PCT Filed: Jul. 23, 2015

(86) PCT No.: PCT/KR2015/007688
§ 371 (c)(1),
(2) Date: Jan. 12, 2017

(87) PCT Pub. No.: WO2016/013890
PCT Pub. Date: Jan. 28, 2016

(65) Prior Publication Data
US 2017/0215062 A1    Jul. 27, 2017

Related U.S. Application Data

(60) Provisional application No. 62/028,344, filed on Jul. 24, 2014, provisional application No. 62/078,951, filed on Nov. 12, 2014.

(51) Int. Cl.
*H04W 4/00* (2018.01)
*H04W 8/08* (2009.01)
(Continued)

(52) U.S. Cl.
CPC .......... *H04W 8/08* (2013.01); *H04L 61/2007* (2013.01); *H04W 76/021* (2013.01);
(Continued)

(58) Field of Classification Search
CPC ..... H04W 8/08; H04W 76/021; H04W 88/10; H04W 92/20; H04W 88/16; H04L 61/2007
See application file for complete search history.

(56) References Cited

U.S. PATENT DOCUMENTS

2013/0003697 A1    1/2013  Adjakple et al.
2013/0010754 A1*   1/2013  Xu ........................ H04W 76/06
                                                            370/331
(Continued)

FOREIGN PATENT DOCUMENTS

JP    2014512762    5/2014
JP    2017513427    5/2017
(Continued)

OTHER PUBLICATIONS

Samsung, "LIPA/SIPTO support in the small cell", 3GPP TSG-RAN WG3 Meeting #81, R3-131440, Aug. 10, 2013, 2 pages.
(Continued)

*Primary Examiner* — Afshawn M Towfighi
(74) *Attorney, Agent, or Firm* — Lee Hong Degerman Kang Waimey

(57) ABSTRACT

A method and apparatus for indicating support of a local gateway (L-GW) in a wireless communication system is provided. A master evolved NodeB (MeNB) in dual connectivity receives an indication of L-GW support from a secondary eNB (SeNB) in dual connectivity, which is co-located with the L-GW, and transmit the indication of L-GW support of the SeNB to a mobility management entity (MME). The indication of L-GW support may include a
(Continued)

local Internet protocol access (LIPA) L-GW transport layer address or a selected IP traffic offload (SIPTO) L-GW transport layer address.

15 Claims, 21 Drawing Sheets

(51) Int. Cl.
*H04L 29/12* (2006.01)
*H04W 76/02* (2009.01)
*H04W 76/11* (2018.01)
*H04W 88/16* (2009.01)
*H04W 92/20* (2009.01)
*H04W 88/10* (2009.01)

(52) U.S. Cl.
CPC ............ *H04W 76/11* (2018.02); *H04W 88/10* (2013.01); *H04W 88/16* (2013.01); *H04W 92/20* (2013.01)

(56) References Cited

U.S. PATENT DOCUMENTS

| | | | |
|---|---|---|---|
| 2013/0089076 A1 | 4/2013 | Olvera-Hernandez et al. | |
| 2015/0327280 A1* | 11/2015 | Zhang | H04L 5/14 370/280 |
| 2016/0227439 A1* | 8/2016 | Wang | H04W 76/12 |
| 2016/0373987 A1* | 12/2016 | Ahmad | H04W 76/00 |

FOREIGN PATENT DOCUMENTS

| | | |
|---|---|---|
| WO | 2012135793 | 10/2012 |
| WO | 2013005992 | 1/2013 |
| WO | 2013006384 | 1/2013 |
| WO | 2015138908 | 9/2015 |

OTHER PUBLICATIONS

MCC, "Report of 3GPP TSG RAN WG3 meeting #81", TSG-RAN Working Group 3 meeting #81bis, TSGR3#81bis R3-131619, Sep. 28, 2013, 111 pages.

3rd Generation Partnership Project, "Technical Specification Group Radio Access Network; Study on Small Cell enhancements for E-UTRA and E-UTRAN; Higher layer aspects (Release 12)", 3GPP TR 36.842 V12.0.0, Dec. 2013, 71 pages.

Japan Patent Office Application No. 2017-503128, Office Action dated Apr. 6, 2018, 6 pages.

Samsung, "Motivation for new WI Proposal on Dual Connectivity Enhancement for LTE", 3GPP TSG RAN Meeting #64, RP-140951, Jun. 2014, 3 pages.

Alcatel-Lucent, et al., "LIPA/SIPTO Support in dual connectivity (SA2 point 9)", 3GPP TSG RAN WG3 Meeting #83, R3-140256, Feb. 2014, 5 pages.

LG Electronics, "Consideration on SIPTO for Dual Connectivity", 3GPP TSG RAN WG3 Meeting #87, R3-150264, Feb. 2015, 5 pages.

* cited by examiner

METHOD AND APPARATUS FOR SUPPORTING LOCAL GATEWAY SERVICE FOR DUAL CONNECTIVITY IN WIRELESS COMMUNICATION SYSTEM

CROSS-REFERENCE TO RELATED APPLICATIONS

This application is the National Stage filing under 35 U.S.C. 371 of International Application No. PCT/KR2015/007688, filed on Jul. 23, 2015, which claims the benefit of U.S. Provisional Application No. 62/028,344, filed on Jul. 24, 2014 and 62/078,951 filed on Nov. 12, 2014, the contents of which are all hereby incorporated by reference herein in their entirety.

FIELD OF THE INVENTION

The present invention relates to wireless communications, and more particularly, to a method and apparatus for supporting local gateway (L-GW) service for dual connectivity in a wireless communication system.

RELATED ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

One of potential solutions for small cell enhancement, dual connectivity has been discussed. Dual connectivity is used to refer to operation where a given user equipment (UE) consumes radio resources provided by at least two different network points connected with non-ideal backhaul. Furthermore, each eNB involved in dual connectivity for a UE may assume different roles. Those roles do not necessarily depend on the eNB's power class and can vary among UEs. Dual connectivity may be one of potential solutions for small cell enhancement.

The LTE network architecture is designed for the centralized gateways where the operator typically only has one or a few gateways. That architecture makes sense for the Internet access because the number of Internet peering points is limited. Different architecture, however, may be needed for the small base stations to allow access to the local content. The local access would be practical for accessing corporate intranet information or accessing a home network over LTE radio.

A method for supporting a local gateway (L-GW) service for dual connectivity may be required.

SUMMARY OF THE INVENTION

The present invention provides a method and apparatus for supporting local gateway (L-GW) service for dual connectivity in a wireless communication system. The present invention provides a method and apparatus for indicating L-GW support of a secondary eNB (SeNB) in dual connectivity, when the SeNB is co-located with the L-GW.

In an aspect, a method for indicating, by a master evolved NodeB (MeNB) in dual connectivity, support of a local gateway (L-GW) in a wireless communication system is provided. The method includes receiving an indication of L-GW support from a secondary eNB (SeNB) in dual connectivity, which is co-located with the L-GW, and transmitting the indication of L-GW support of the SeNB to a mobility management entity (MME).

In another aspect, a master evolved NodeB (MeNB) in dual connectivity includes a memory, a transceiver, and a processor coupled to the memory and the transceiver, and configured to control the transceiver to receive an indication of a local gateway (L-GW) support from a secondary eNB (SeNB) in dual connectivity, which is co-located with the L-GW, and control the transceiver to transmit the indication of L-GW support of the SeNB to a mobility management entity (MME).

An L-GW can be supported efficiently in dual connectivity.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
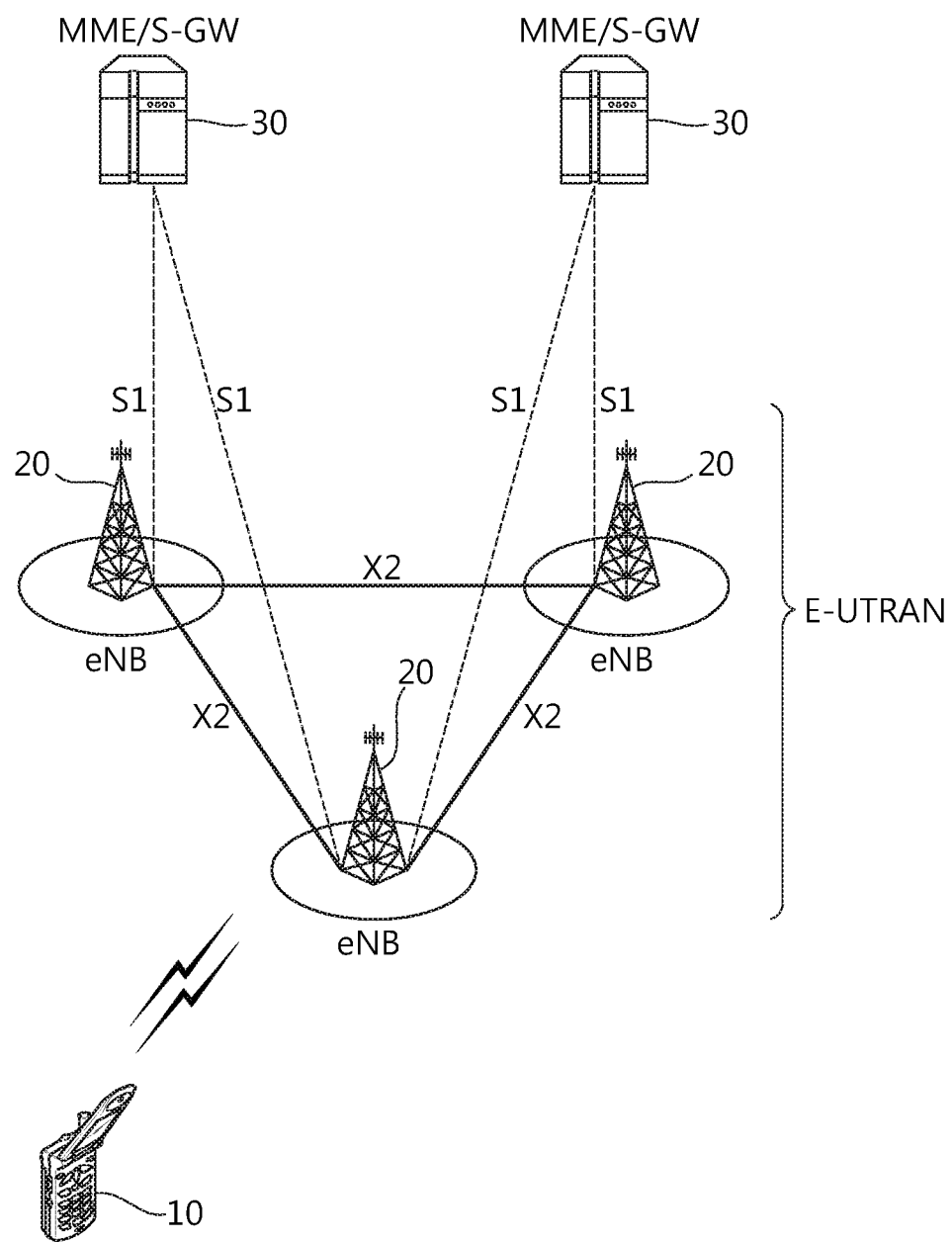
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
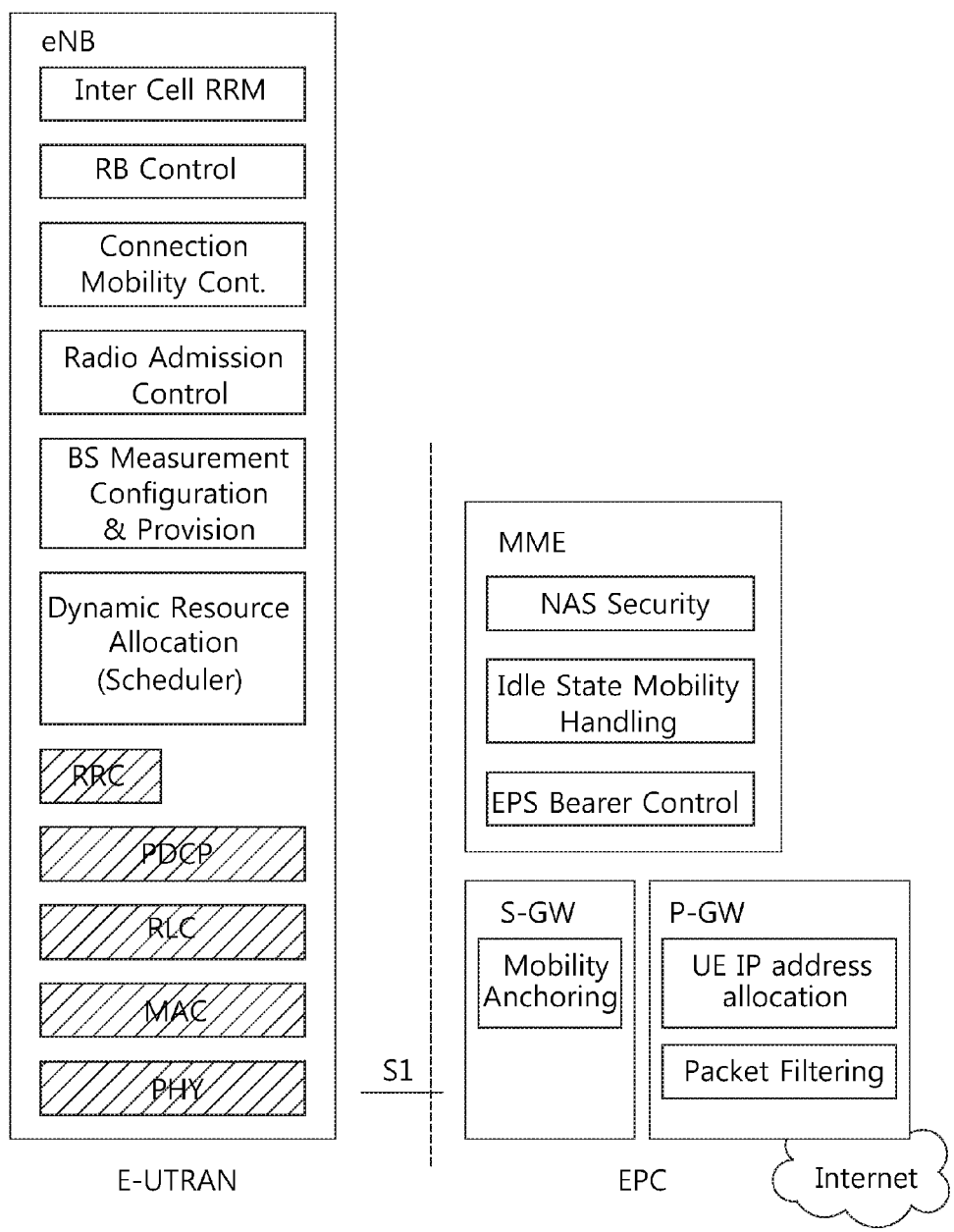
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
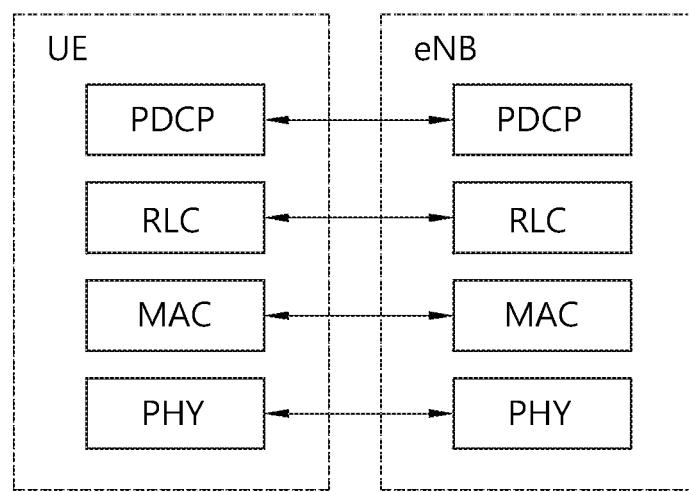
FIG. 3 shows a block diagram of a user plane protocol stack of an LTE system.
Figure 4:
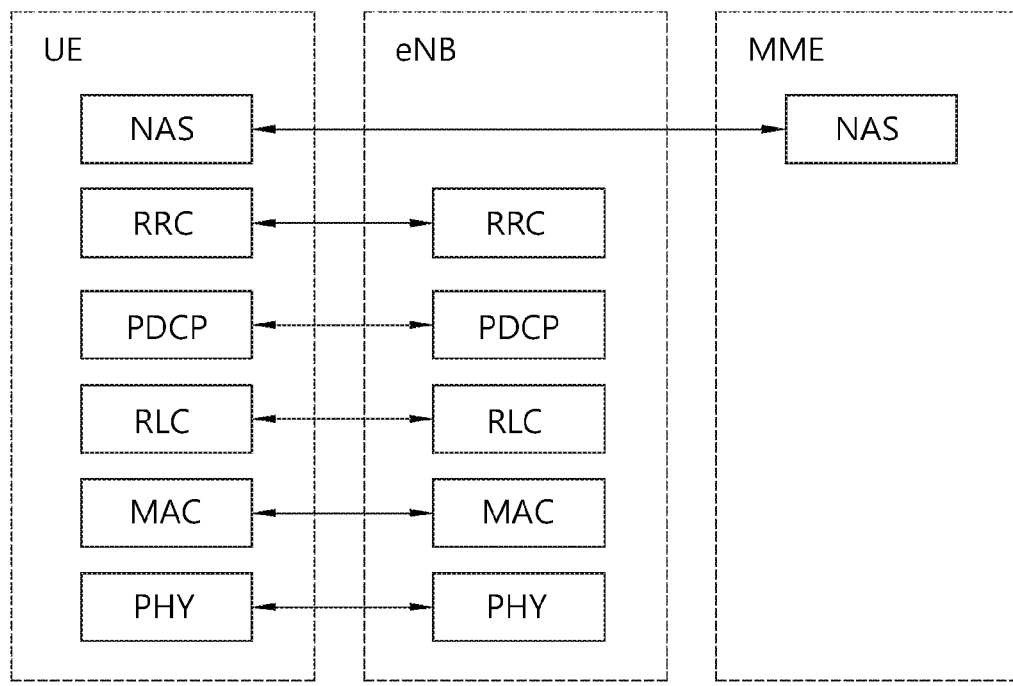
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
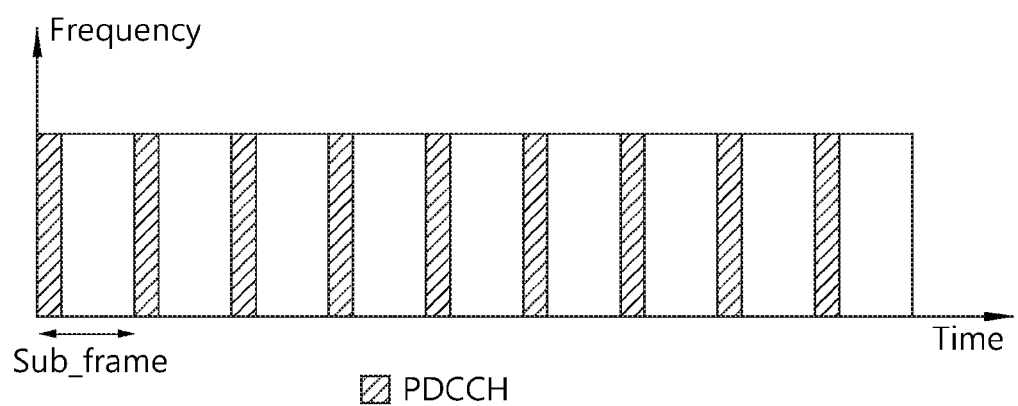
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Overall architecture and network interface for dual connectivity (DC) is described. It may be referred to 3GPP TR 36.842 V12.0.0 (2013 December). The E-UTRAN supports dual connectivity operation whereby a multiple RX/TX UE in RRC_CONNECTED is configured to utilize radio resources provided by two distinct schedulers, located in two eNBs connected via a non-ideal backhaul over the X2 interface. The overall E-UTRAN architecture described in FIG. 1 is applicable for dual connectivity as well. Two different roles may be assumed to eNBs involved in dual connectivity for a certain UE: an eNB may either act as a master eNB (MeNB) or as a secondary eNB (SeNB). The MeNB is the eNB which terminates at least S1-MME in dual connectivity. The SeNB is the eNB that is providing additional radio resources for the UE but is not the MeNB in dual connectivity. In dual connectivity a UE is connected to one MeNB and one SeNB.

Figure 6:
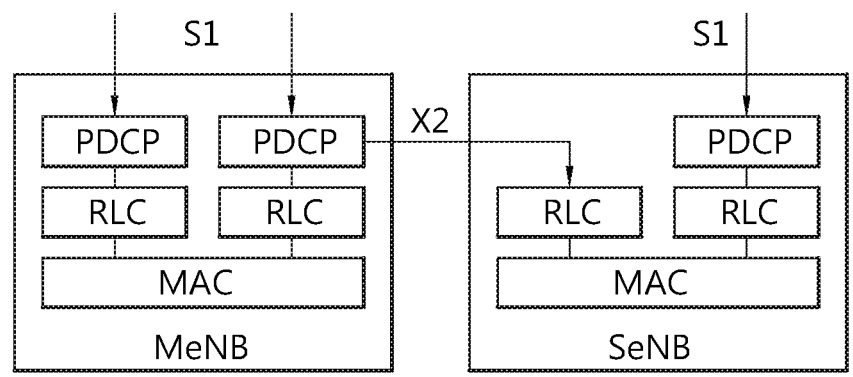
FIG. 6 shows radio protocol architecture for dual connectivity.

FIG. 6 shows radio protocol architecture for dual connectivity. In DC, the radio protocol architecture that a particular bearer uses depends on how the bearer is setup. Three alternatives exist, master cell group (MCG) bearer, secondary cell group (SCG) bearer and split bearer. Referring to FIG. 6, those three alternatives are depicted, i.e. in order of the MCG bearer, split bearer and SCG bearer from left to right. The MCG bearer is a bearer whose radio protocols are only located in the MeNB to use MeNB resources only in dual connectivity. The SCG bearer is a bearer whose radio protocols are only located in the SeNB to use SeNB resources in dual connectivity. The split bearer is a bearer whose radio protocols are located in both the MeNB and the SeNB to use both MeNB and SeNB resources in dual connectivity. Signaling radio bearers (SRBs) are always of the MCG bearer and therefore only use the radio resources provided by the MeNB. The MCG is a group of serving cells associated with the MeNB, comprising of the primary cell (PCell) and optionally one or more secondary cells (SCells) in dual connectivity. The SCG is a group of serving cells associated with the SeNB, comprising of primary SCell (PSCell) and optionally one or more SCells in dual connectivity. DC may also be described as having at least one bearer configured to use radio resources provided by the SeNB.

Figure 7:
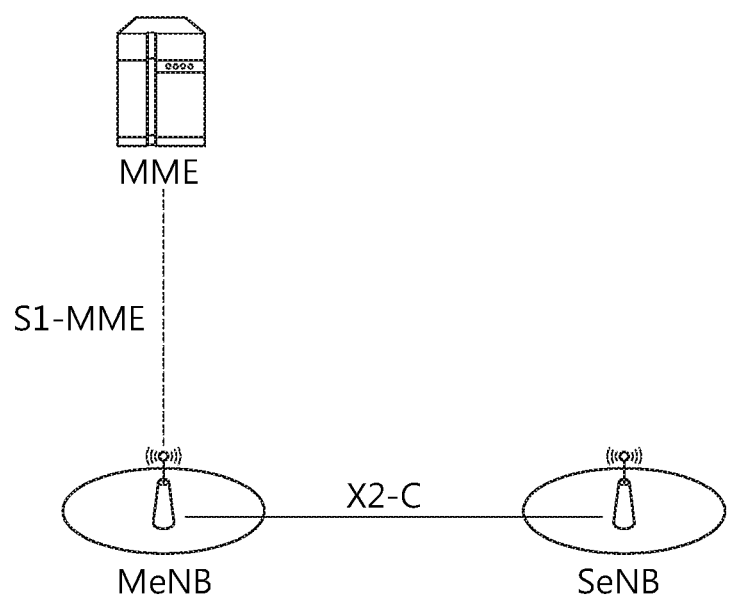
FIG. 7 shows C-plane connectivity of eNBs involved in dual connectivity for a certain UE.

FIG. 7 shows C-plane connectivity of eNBs involved in dual connectivity for a certain UE. Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling. Referring to FIG. 7, the MeNB is C-plane connected to the MME via S1-MME, the MeNB and the SeNB are interconnected via X2-C.

Figure 8:
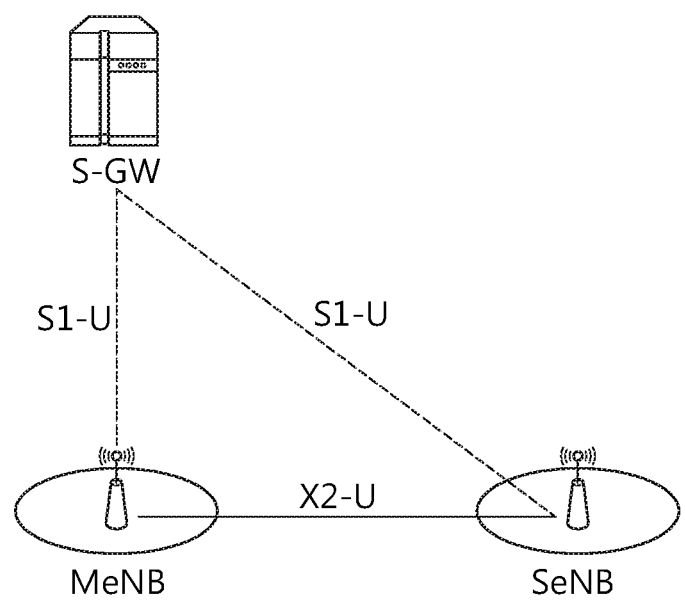
FIG. 8 shows U-plane connectivity of eNBs involved in dual connectivity for a certain UE.

FIG. 8 shows U-plane connectivity of eNBs involved in dual connectivity for a certain UE. U-plane connectivity depends on the bearer option configured. For MCG bearers, the MeNB is U-plane connected to the S-GW via S1-U, the SeNB is not involved in the transport of user plane data. For split bearers, the MeNB is U-plane connected to the S-GW via S1-U and in addition, the MeNB and the SeNB are interconnected via X2-U. For SCG bearers, the SeNB is directly connected with the S-GW via S1-U. If only MCG and split bearers are configured, there is no S1-U termination in the SeNB.

Figure 9:
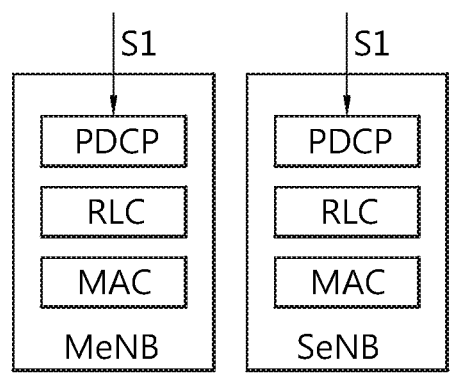
FIG. 9 shows an example of U-plane architecture for dual connectivity.

FIG. 9 shows an example of U-plane architecture for dual connectivity. U-plane architecture for dual connectivity shown in FIG. 9 is the combination of S1-U that terminates in SeNB and independent PDCPs (no bearer split). U-plane architecture for dual connectivity shown in FIG. 9 may be called "Architecture 1A".

Figure 10:
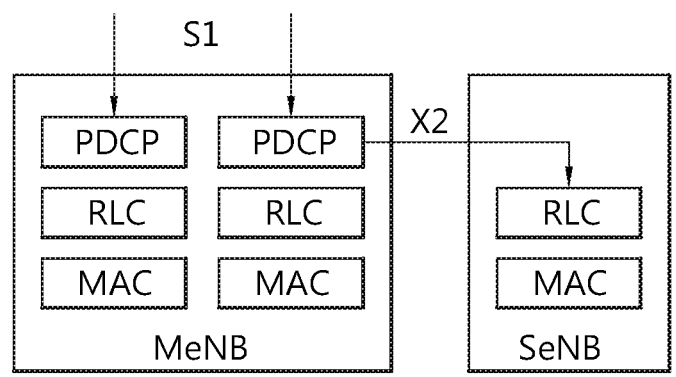
FIG. 10 shows another example of U-plane architecture for dual connectivity.

FIG. 10 shows another example of U-plane architecture for dual connectivity. U-plane architecture for dual connectivity shown in FIG. 10 is the combination of S1-U that terminates in MeNB, bearer split in MeNB, and independent RLCs for split bearers. U-plane architecture for dual connectivity shown in FIG. 10 may be called "Architecture 3C".

Local IP access (LIPA) function enables a UE to access directly enterprise or residential network without user plane data travelling first to the centralized gateway. LIPA functionality would make sense together with home eNB (HeNB). A local gateway (L-GW) is co-located with a femto for the local access. The L-GW supports of internal direct user plane path with the HeNB.

Dual connectivity was introduced in 3GPP LTE rel-12. Further, LIPA/selected IP traffic offload (SIPTO) was introduced in the past releases. A potential architecture of 3GPP LTE rel-13 is that the L-GW is supported for dual connectivity.

Figure 11:
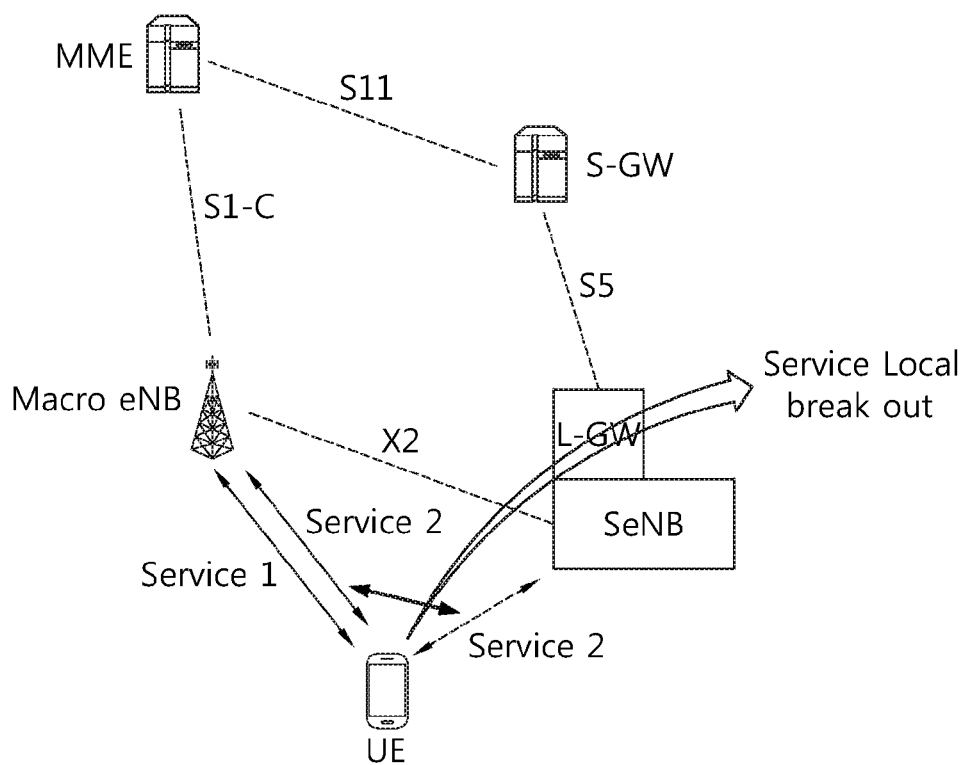
FIG. 11 shows an example of architecture of dual connectivity in which a local gateway locates together with a SeNB.

FIG. 11 shows an example of architecture of dual connectivity in which a local gateway locates together with a SeNB. Service 1 is provided by the MeNB. Service 2, which is provided by the MeNB, is to be moved to the SeNB, which is co-located with the L-GW.

In the architecture of dual connectivity described above, some problem may happen for the legacy LIPA/SIPTO initiation procedure, since the SeNB has no direct S1-C connection with the MME to the legacy LIPA/SIPTO initiation procedure. Further, based on the architecture of dual connectivity described above, how the E-UTRAN radio access bearer (E-RAB) can be served by the L-GW has not yet defined clearly.

In order to solve the problem described above, a method for indicating L-GW support of the SeNB, which is co-located with the L-GW, is described below according to an embodiment of the present invention.

First, in order to be ready to trigger the L-GW based service, how the MeNB knows about the L-GW IP address of the SeNB or indication of L-GW support according to an embodiment of the present invention is described.

For a cell specific procedure, the MeNB may get the L-GW IP address of the SeNB and/or indication of L-GW support through the X2 Setup Request message or X2 Setup Response message, according to an embodiment of the present invention. The L-GW IP address may be LIPA L-GW transport layer address or SIPTO L-GW transport layer address. Specifically, when the MeNB initiates the request, the MeNB may transmit the X2 Setup Request message to the SeNB, and then, the SeNB may reply with the X2 Setup Response message including an indication of L-GW support, which may include the L-GW IP address. Alternatively, when the SeNB initiates the request, the SeNB may transmit the X2 Setup Request message to the MeNB including an indication of L-GW support, which may include the L-GW IP address. And then, the MeNB may reply with the X2 Setup Response message.

Figure 12:
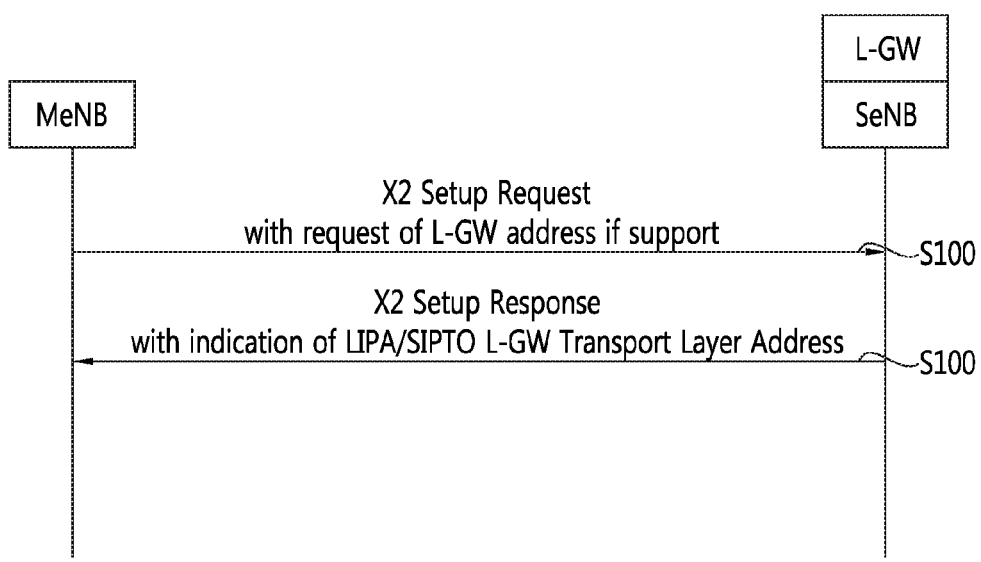
FIG. 12 shows an example of a method for indicating L-GW support according to an embodiment of the present invention.

FIG. 12 shows an example of a method for indicating L-GW support according to an embodiment of the present invention. In step S100, the MeNB transmits the X2 Setup Request message to the SeNB with a request of indication of L-GW support (or, L-GW IP address) directly if support. In step S110, the SeNB, which is co-located with the L-GW, transmits the X2 Setup Response message with an indication of L-GW support and/or LIPA/SIPTO L-GW transport layer address directly.

Instead of the X2 Setup Request/Response message as described above, other existing messages may also be used for the same purpose. For example, eNB Configuration Update/Response message may be used for indicating L-GW support. Alternatively, new messages or information elements (IEs) in new message may also be used for the same purpose.

According to an embodiment of the present invention described above, the L-GW IP address can be ready for the MeNB to use for the cases, such as every idle-active transition, e.g. uplink NAS transport procedure, tracking area update (TAU) procedure, path switch procedure (E-RAB modification indication procedure or new procedure for split bearer case), etc. The MeNB can use the indication of L-GW support and/or L-GW IP address to trigger L-GW service in any time.

For a UE-specific procedure, in order to indicate L-GW support, SeNB addition procedure may be used according to an embodiment of the present invention. The SeNB addition procedure may be performed during the new service request.

Figure 13:
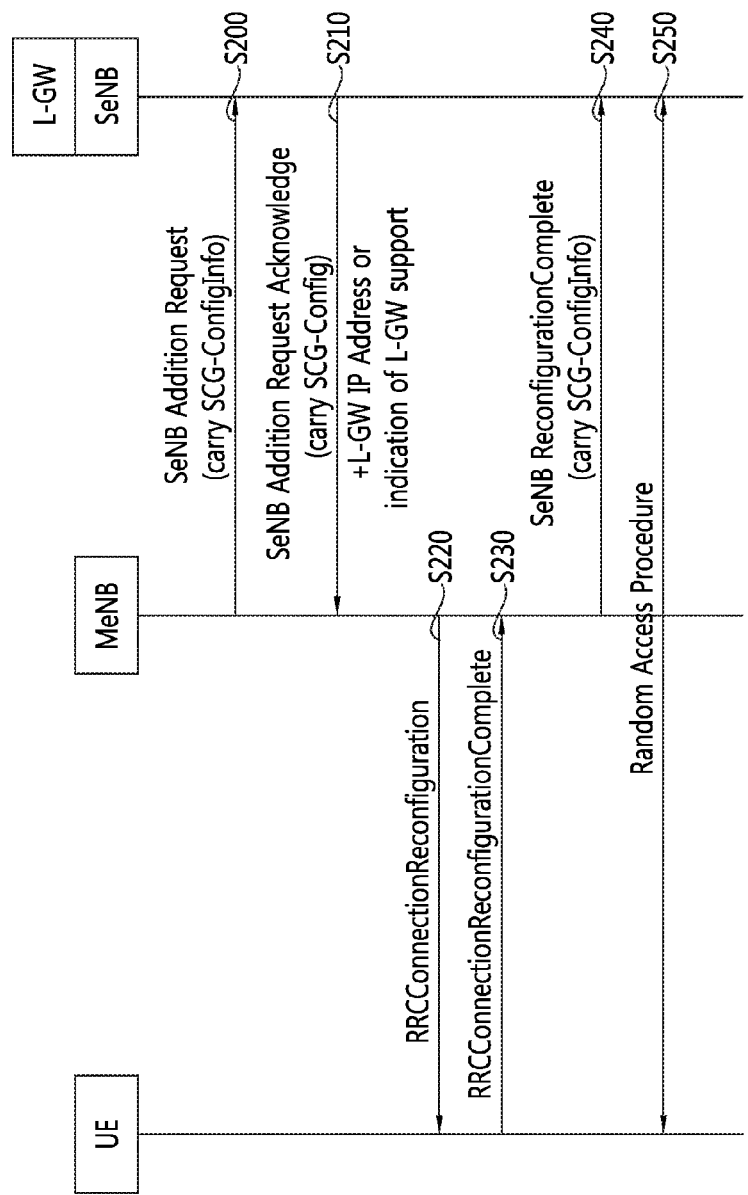
FIG. 13 shows another example of a method for indicating L-GW support according to an embodiment of the present invention.

FIG. 13 shows another example of a method for indicating L-GW support according to an embodiment of the present invention. In step S200, the MeNB transmits the SeNB Addition Request message to the SeNB. In step S210, the SeNB transmit the SeNB Addition Request Acknowledge message including an indication of L-GW support, which may include the L-GW IP address. The L-GW IP address may be LIPA L-GW transport layer address or SIPTO L-GW transport layer address. In step S220, the MeNB transmits the RRCConnectionReconfiguration message to the UE. In step S230, the UE transmits RRCConnectionReconfigurationComplete message to eh MeNB. In step S240, the MeNB transmits the SeNB Reconfiguration Complete message to the SeNB. In step S250, the UE and SeNB perform the random access procedure.

Second, how the MeNB notifies the MME about the L-GW IP address of the SeNB and/or indication of L-GW support according to an embodiment of the present invention is described.

Figure 14:
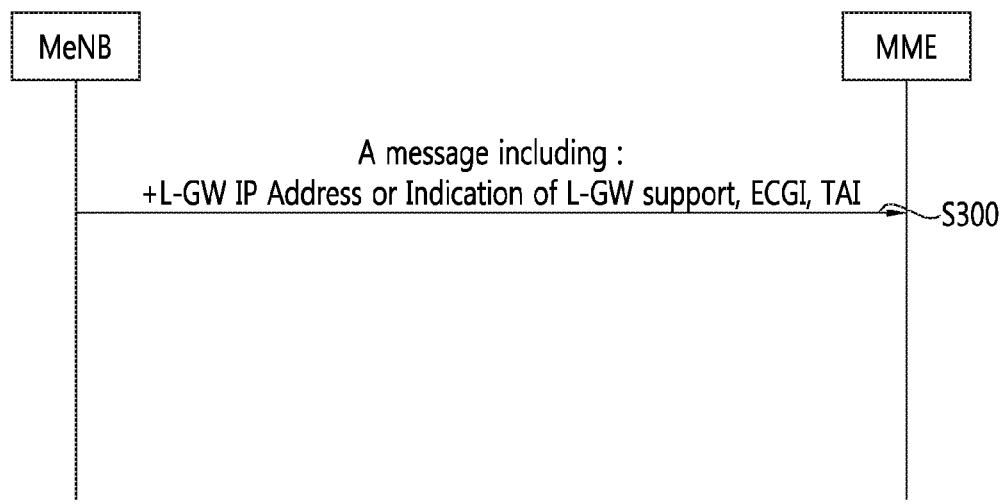
FIG. 14 shows another example of a method for indicating L-GW support according to an embodiment of the present invention.

FIG. 14 shows another example of a method for indicating L-GW support according to an embodiment of the present invention. In step S300, the MeNB transmits a message, which includes at least one of the indication of L-GW support, L-GW IP address, E-UTRAN cell global ID (ECGI), tracking area ID (TAI), etc., to the MeNB. The L-GW IP address may be LIPA L-GW transport layer address or SIPTO L-GW transport layer address. The message may be mapped to the E-RAB modification indication procedure (or a new message in the E-RAB modification indication procedure due to split bearer) for the case of the SeNB addition offload procedure. Alternatively, the message may be mapped to the tracking area update procedure for case of the TAU procedure. Alternatively, the message may be mapped to the initial UE message procedure (idle to connected transition) for the idle to connected transition. Alternatively, the message may be mapped to the uplink NAS transport procedure (new service request, etc.) for the case of new service request.

Third, how the MeNB gets the correlation ID information from the MME according to an embodiment of the present invention is described.

Figure 15:
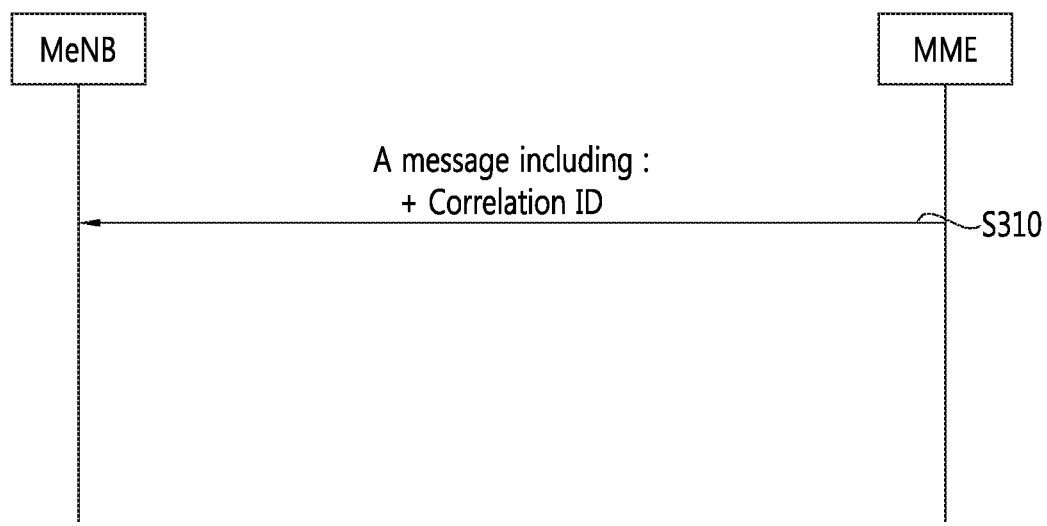
FIG. 15 shows an example of a method for indicating a correlation ID according to an embodiment of the present invention.

FIG. 15 shows an example of a method for indicating a correlation ID according to an embodiment of the present invention. In step S310, the MME transmits a message, which includes a correlation ID for supporting of the L-GW in the SeNB side, to the MeNB. The message may be mapped to the E-RAB modification confirm procedure (or a new message in the E-RAB modification confirm procedure due to split bearer) for the case of SeNB addition procedure. Alternatively, the message may be mapped to the E-RAB setup request procedure for the case of new service request. Alternatively, the message may be mapped to the initial context setup request procedure for the case of idle to connected transition.

Fourth, how the MeNB notifies the correlation ID to the SeNB according to an embodiment of the present invention is described.

Figure 16:
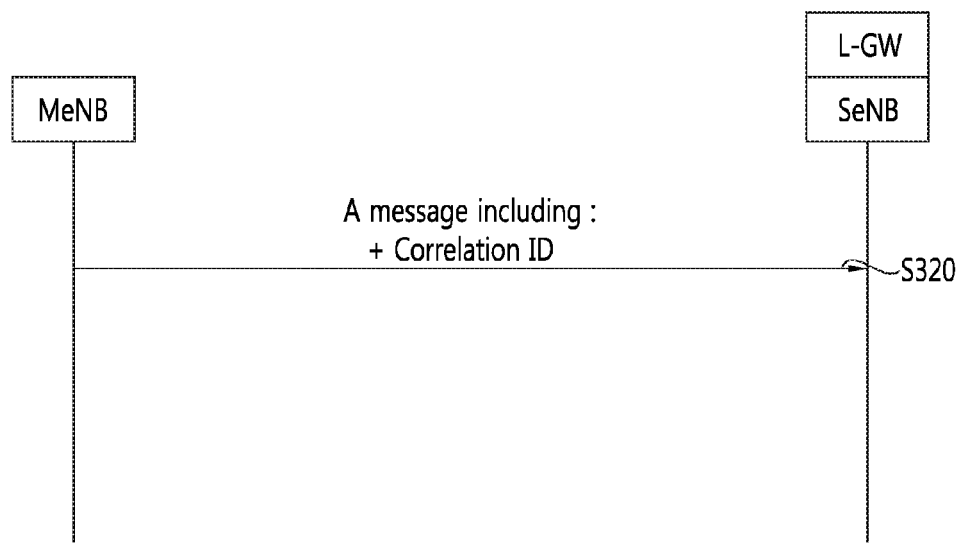
FIG. 16 shows another example of a method for indicating a correlation ID according to an embodiment of the present invention.

FIG. 16 shows another example of a method for indicating a correlation ID according to an embodiment of the present invention. In step S320, the MeNB transmits a message, which includes a correlation ID for supporting of the L-GW in the SeNB side, to the SeNB. The message may be mapped to the SeNB addition procedure (in case that the MeNB decides to add the E-RAB directly to the SeNB during a new service request procedure or idle to connected transition procedure). Alternatively, the MeNB may create and use a new message to notify the SeNB of the correlation ID.

Figure 17:
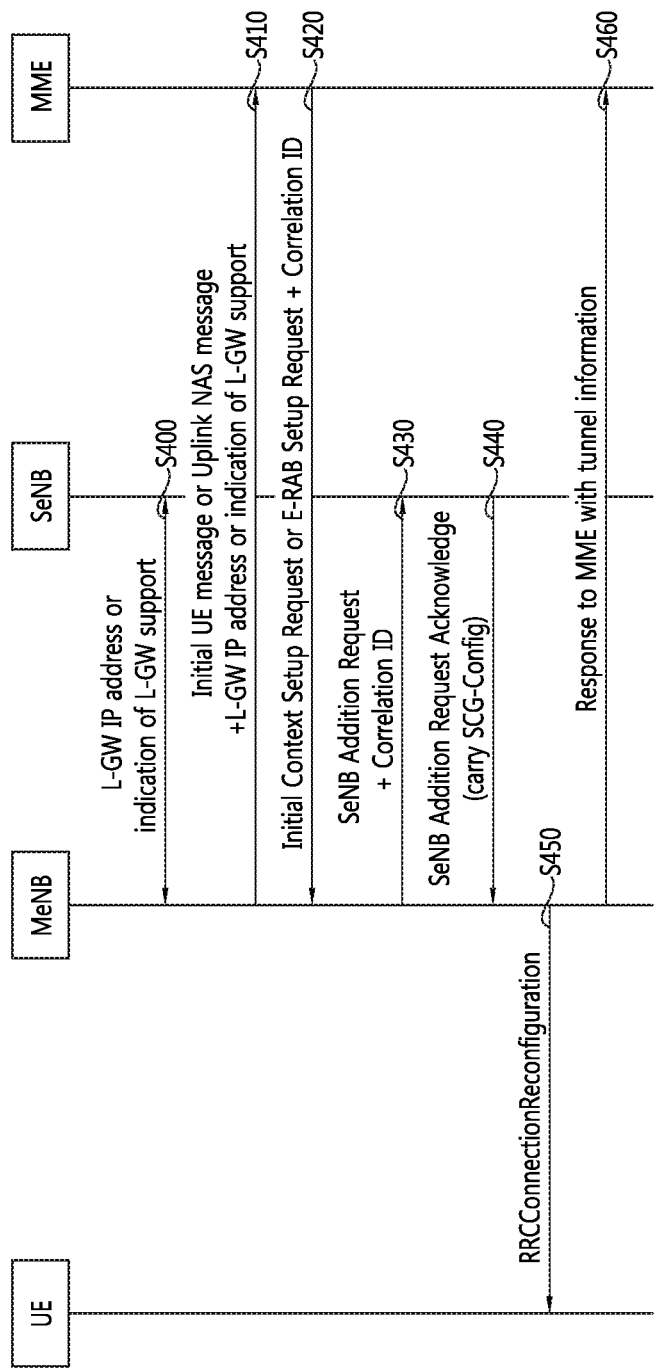
FIG. 17 shows another example of a method for indicating L-GW support according to an embodiment of the present invention.

FIG. 17 shows another example of a method for indicating L-GW support according to an embodiment of the present invention.

For the procedure to know the L-GW IP address of the SeNB and/or an indication of L-GW support, in step S400, the SeNB may transmit the indication of L-GW support and/or LIPA/SIPTO L-GW transport layer address to the MeNB. The indication of L-GW support and/or LIPA/SIPTO L-GW transport layer address may be transmitted by using the cell-specific procedure described in FIG. 12, or by using the UE-specific procedure described in FIG. 13.

During the attach/new service request/new PDN connectivity procedure, in step S410, the MeNB transmits the initial UE message or uplink NAS message, which includes the indication of L-GW support and/or LIPA/SIPTO L-GW transport layer address, to the MME. Step S410 may correspond to the procedure described in FIG. 14.

In step S420, the MME transmits the Initial Context Setup Request message or the E-RAB Setup Request message, which includes the correlation ID, to the MeNB. Step S420 may correspond to the procedure described in FIG. 15.

During the SeNB addition procedure, in step S430, the MeNB transmits the SeNB Addition Request message, which includes the correlation ID, to the SeNB. Step S430 may correspond to the procedure described in FIG. 16. In step S440, the SeNB transmits the SeNB Addition Request Acknowledge message to the MeNB. In step S450, the MeNB transmits the RRCConnectionReconfiguration message to the UE. In step S460, the MeNB makes a response to the MME with tunnel information.

Figure 18:
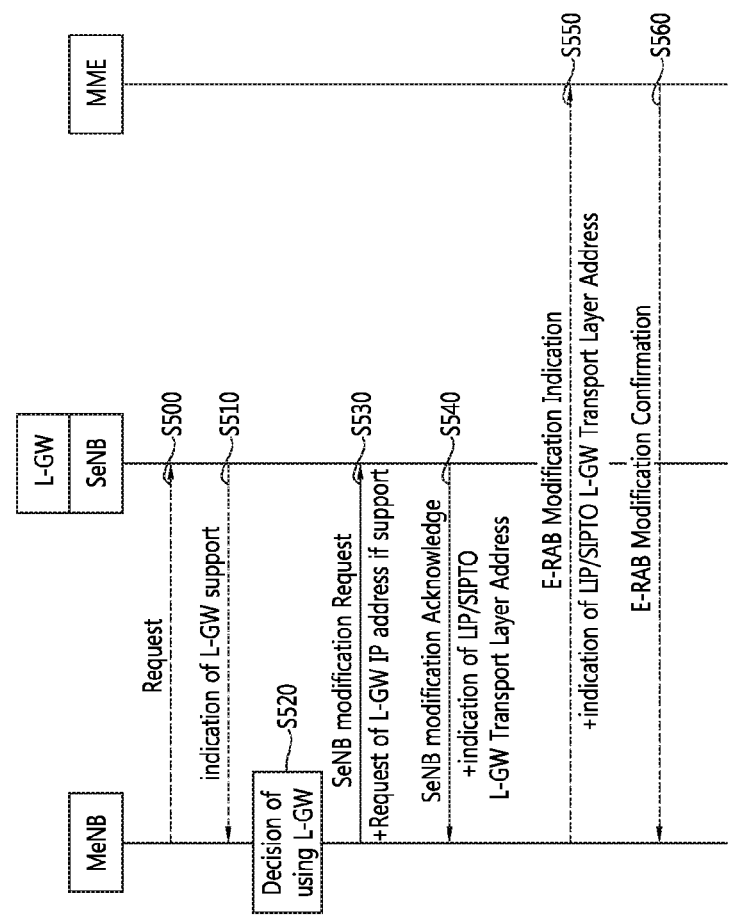
FIG. 18 shows another example of a method for indicating L-GW support according to an embodiment of the present invention.

FIG. 18 shows another example of a method for indicating L-GW support according to an embodiment of the present invention. This embodiment is described based on the SeNB modification procedure as an example, but and other SeNB related mobility procedures may also be used.

In step S500, the MeNB may transmit the request of an indication of L-GW support to the SeNB. In step S510, the SeNB may transmit the indication of L-GW support, which may include the L-GW IP address, to the MeNB if it supports the L-GW. The L-GW IP address may be LIPA L-GW transport layer address or SIPTO L-GW transport layer address. In step S520, the MeNB decides to use L-GW service. Steps S500 to S520 may correspond to the procedure described in FIG. 12. That is, Steps S500 to S520 may be realized by the X2 Setup Request/Response message described in FIG. 12.

In step S530, the MeNB transmits the SeNB Modification Request message to the SeNB with a request of the indication of L-GW support and/or L-GW IP address (i.e. LIPA/SIPTO L-GW transport layer address) if support. In step S540, the SeNB transmits the SeNB Modification Response message with the indication of L-GW support and/or L-GW IP address (i.e. LIPA/SIPTO L-GW transport layer address) directly if support. Instead of the SeNB Modification Request/Response message, the indication of L-GW support and/or L-GW IP address may be transmit by using other existing message, new message or IEs in a new message.

In step S550, the MeNB may transmit the E-RAB Modification Indication message to the MME with the indication of L-GW support and/or L-GW IP address (i.e. LIPA/SIPTO L-GW transport layer address), in order to make the MME trigger the L-GW service with messages sending to the S-GW and current P-GW. In step S560, the MME may transmit the E-RAB Modification Confirm message to the MeNB.

Figure 19:
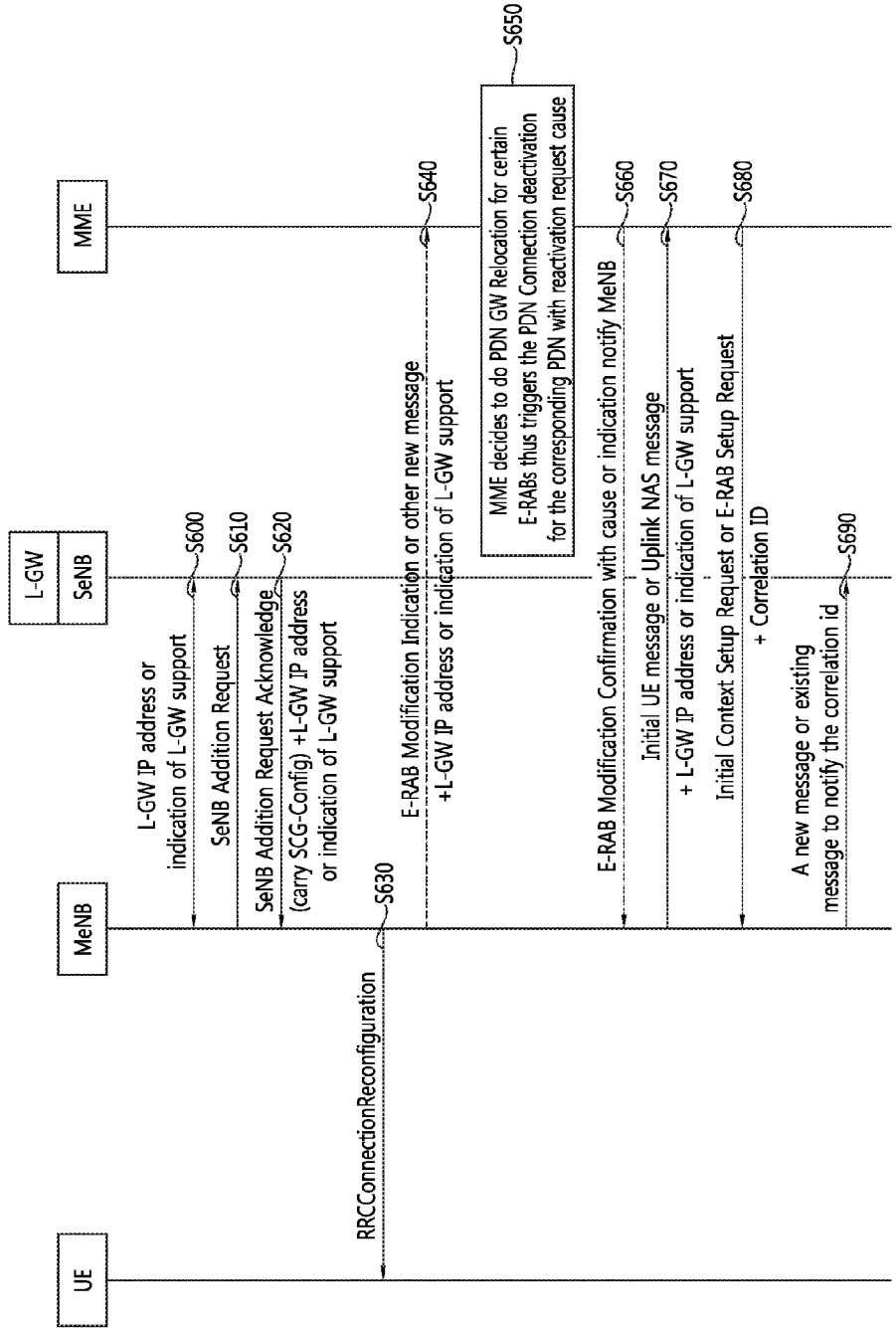
FIG. 19 shows another example of a method for indicating L-GW support according to an embodiment of the present invention.

FIG. 19 shows another example of a method for indicating L-GW support according to an embodiment of the present invention.

For the procedure to know the L-GW IP address of the SeNB and/or an indication of L-GW support, in step S600, the SeNB may transmit the indication of L-GW support and/or L-GW IP address to the MeNB. The indication of L-GW support and/or L-GW IP address may be transmitted by using the cell-specific procedure described in FIG. 12.

During the SeNB addition procedure, in step 610, the MeNB transmits the SeNB Addition Request message to the SeNB. In step S620, the SeNB transmits the SeNB Addition Request Acknowledge message, which includes the indication of L-GW support and/or L-GW IP address, to the MeNB. In step S630, the MeNB transmits the RRCConnectionReconfiguration message to the UE. This procedure may corresponds to the procedure described in FIG. 13.

In step S640, the MeNB transmits the E-RAB Modification Indication message or a new message, which includes the indication of L-GW support and/or L-GW IP address, to the MME. In step S650, the MME decides to do PDN GW relocation for certain E-RABS, thus triggers the PDN connection deactivation for the corresponding PDN with reactivation request cause. In step S660, the MME transmits the E-RAB Modification Confirmation message, which includes a cause of indication to notify the MeNB, to the MeNB.

The UE triggers to re-establish the corresponding PDN connection. Thus, in step S670, the MeNB transmits the initial UE message or uplink NAS message, which includes the indication of L-GW support and/or L-GW IP address, to the MME. Step S670 may correspond to the procedure described in FIG. 14.

In step S680, the MME transmits the Initial Context Setup Request message or the E-RAB Setup Request message, which includes the correlation ID, to the MeNB. Step S680 may correspond to the procedure described in FIG. 15.

In step S690, the MeNB transmits a new message or existing message, which includes the correlation ID, to the SeNB. Step S690 may correspond to the procedure described in FIG. 16.

Figure 20:
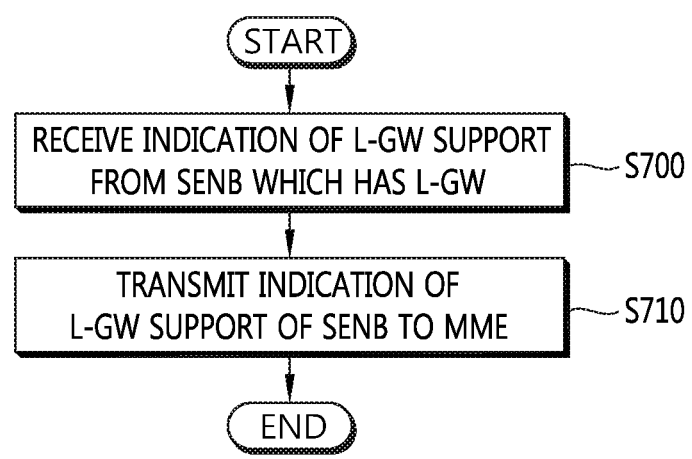
FIG. 20 shows another example of a method for indicating L-GW support according to an embodiment of the present invention.

FIG. 20 shows another example of a method for indicating L-GW support according to an embodiment of the present invention.

In step S700, the MeNB receives an indication of L-GW support from the SeNB, which is co-located with the L-GW. The indication of L-GW support may include a LIPA L-GW transport layer address or a SIPTO L-GW transport layer address. The indication of L-GW support may be received via a cell-specific procedure, i.e. an X2 Setup Request message or an X2 Setup Response message. Or, the indication of L-GW support may be received via a UE-specific procedure, i.e. a SeNB Addition Request Acknowledge message.

In step S710, the MeNB transmits the indication of L-GW support of the SeNB to the MME. The indication of L-GW support may be transmitted during one of the E-RAB modification indication procedure, a tracking area update procedure, an initial UE message procedure, or an uplink NAS transport procedure.

Further, the MeNB may receive a correlation ID from the MME. The correlation ID may be received during one of an E-RAB modification confirmation procedure, an E-RAB setup request procedure, or an initial context setup request procedure. Further, the MeNB may transmit the received correlation ID to the SeNB. The correlation ID may be transmitted during one of a SeNB addition procedure or a SeNB modification procedure or via a new message.

Figure 21:
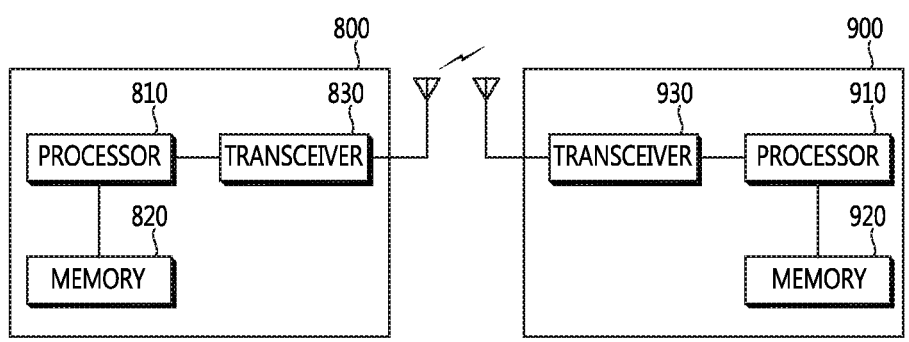
FIG. 21 shows a wireless communication system to implement an embodiment of the present invention.

FIG. 21 shows a wireless communication system to implement an embodiment of the present invention.

A first eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A second eNB or MME 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for receiving, by a master evolved NodeB (MeNB) in dual connectivity, an Internet protocol (IP) address of a local gateway (L-GW) in a wireless communication system, the method comprising:
   receiving the IP address of the L-GW, which is co-located with a secondary eNodeB (SeNB) in dual connectivity but is not connected with the MeNB, from the SeNB; and
   transmitting a correlation identifier (ID) for the L-GW to the SeNB.

2. The method of claim 1, wherein the IP address of the L-GW includes at least one of a local Internet protocol access (LIPA) L-GW transport layer address or a selected IP traffic offload (SIPTO) L-GW transport layer address.

3. The method of claim 1, wherein the IP address of the L-GW indicates that the SeNB supports the L-GW.

4. The method of claim 1, wherein the IP address of the L-GW is received via a SeNB Addition Request Acknowledge message.

5. The method of claim 1, further comprising receiving the correlation ID for the L-GW from a MME.

6. The method of claim 5, wherein the correlation ID for the L-GW is received during one of an E-RAB modification confirmation procedure, an E-RAB setup request procedure, or an initial context setup request procedure.

7. The method of claim 1, wherein the correlation ID for the L-GW is transmitted via a SeNB Addition Request message.

8. A master evolved NodeB (MeNB) in dual connectivity comprising:
   a memory; and
   a processor, coupled to the memory,
   receives an Internet protocol (IP) address of a local gateway (L-GW),
   which is co-located with a secondary eNodeB (SeNB) in dual connectivity but is not connected with the MeNB, from the SeNB; and
   transmits a correlation identifier (ID) for the L-GW to the SeNB.

9. The MeNB of claim 8, wherein the IP address of the L-GW includes at least one of a local Internet protocol access (LIPA) L-GW transport layer address or a selected IP traffic offload (SIPTO) L-GW transport layer address.

10. The MeNB of claim 8, wherein the IP address of the L-GW indicates that the SeNB supports the L-GW.

11. The MeNB of claim 8, wherein the IP address of the L-GW is received via a SeNB Addition Request Acknowledge message.

12. The MeNB of claim 8, wherein the processor further receives the correlation ID for the L-GW from a mobility management entity (MME).

13. The MeNB of claim 8, wherein the correlation ID for the L-GW is transmitted via a SeNB Addition Request message.

14. The method of claim 1, further comprising transmitting the IP address of the L-GW to a mobility management entity (MME).

15. The method of claim 14, wherein the IP address of the L-GW is transmitted during one of an E-UTRAN radio access bearer (E-RAB) modification indication procedure, a tracking area update procedure, an initial UE message procedure, or an uplink non-access stratum (NAS) transport procedure.

* * * * *